(12) United States Patent
Mochizuki (10) Patent No.: US 6,608,621 B2
(45) Date of Patent: Aug. 19, 2003

(54) IMAGE DISPLAYING METHOD AND APPARATUS

(75) Inventor: Noritaka Mochizuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 09/760,703

(22) Filed: Jan. 17, 2001

(65) Prior Publication Data

US 2001/0050727 A1 Dec. 13, 2001

(30) Foreign Application Priority Data

Jan. 20, 2000 (JP) ........................................ 2000-011164

(51) Int. Cl.$^7$ ................................................ G02F 1/29
(52) U.S. Cl. .......................... 345/204; 345/5; 345/32; 345/84; 345/85; 345/98; 359/138; 359/315; 359/318; 359/322; 359/325; 359/326
(58) Field of Search .......................... 345/84, 85, 98, 345/204, 5, 32; 359/326, 315, 318, 322, 325, 138

(56) References Cited

U.S. PATENT DOCUMENTS

| | | | | |
|---|---|---|---|---|
| 4,658,291 A | * | 4/1987 | Morishita | 348/42 |
| 4,737,896 A | | 4/1988 | Mochizuki et al. | 362/301 |
| 5,191,624 A | * | 3/1993 | Ito et al. | 369/44.11 |
| 5,299,042 A | * | 3/1994 | Takanashi et al. | 349/7 |
| 5,587,742 A | * | 12/1996 | Hau et al. | 348/441 |
| 5,671,069 A | * | 9/1997 | Kodama | 358/409 |
| 5,877,886 A | * | 3/1999 | Ishii et al. | 359/212 |
| 5,905,483 A | * | 5/1999 | Yuki | 345/204 |
| 5,914,807 A | * | 6/1999 | Downing | 359/326 |
| 5,956,172 A | * | 9/1999 | Downing | 359/326 |
| 6,055,090 A | * | 4/2000 | Miles | 345/84 |
| 6,342,921 B1 | * | 1/2002 | Yamaguchi et al. | 348/322 |
| 6,392,618 B1 | * | 5/2002 | Kimura | 345/31 |
| 6,449,084 B1 | * | 9/2002 | Guo | 359/315 |

FOREIGN PATENT DOCUMENTS

JP 61-26271 6/1986

* cited by examiner

Primary Examiner—Bipin Shalwala
Assistant Examiner—Vincent E. Kovalick (57) ABSTRACT

An image displaying method and apparatus is provided which can display an image at a high luminance. A first horizontal line image signal is written in a write memory, read in parallel from a read memory during a horizontal blanking period next to the horizontal image signal period, and amplified to thereafter perform modulation. The first horizontal line image signal is displayed at least until the next horizontal image signal line period terminates. The above operations are sequentially repeated to scan all horizontal lines.

5 Claims, 7 Drawing Sheets

IMAGE DISPLAYING METHOD AND APPARATUS

BACKGROUND OF THE INVENTION

1. Field of the Invention

The present invention relates to a method and apparatus for displaying an image signal such as a television signal, and more particularly to an image displaying method and apparatus capable of displaying an image at a high luminance.

2. Related Background Art

One horizontal period of a television signal has a horizontal image signal period and a horizontal blanking period. A scanning system for such image signals has generally a horizontal scanning time of 50 μsec and a horizontal blanking time of 12.7 μsec. Therefore, the period during which a beam is applied to each picture element (pixel) in one scan line is the period derived by dividing the horizontal scanning time by the number of pixels. For example, if one scan line has 500 pixels, the period is 100 nsec (=50 μsec/500).

In a conventional image displaying method, the time while an electron beam is applied to each pixel is very short. Accordingly, a very high beam energy is required to obtain a certain level of satisfactory luminance.

In order to solve this problem, techniques are disclosed in Japanese Patent Publication No. 61-26271 in which one horizontal scanning period of an image signal is divided into a plurality of periods, and the image signals in each period are processed in parallel to prolong the supply time of an electron beam to each pixel and to increase the luminance.

Figure 9:
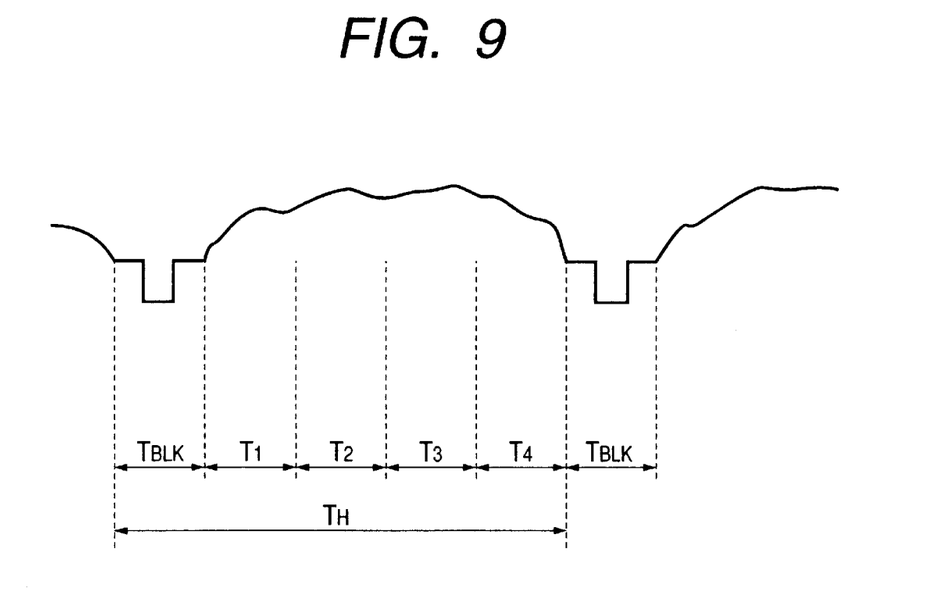
FIG. 9 is a diagram explaining conventional techniques.

Specifically, as shown in FIG. 9, one horizontal scanning period ($T_H$) is divided into five periods each having a time equal to the horizontal blanking time ($T_{BLK}$). Of these five periods, the four periods are effective display periods of image signals. Target pixels in the horizontal direction are divided into four groups of pixels and electron beams are sequentially supplied to the pixels in each group.

With this method described in Japanese Patent Publication No. 61-26271, image signals in each divided group cannot be converted into parallel signals unless all image signals in the divided group are read. Therefore, the parallel signals converted from image signals in each divided period are output and displayed during the next divided period. Specifically, the image signals corresponding to the periods $T_1$, $T_2$, $T_3$ and $T_4$ are converted into parallel signals and output and displayed at the same time during the first to fourth quarter division periods of a target scan line.

With this method, however, although the image signals corresponding to the period $T_4$ can be displayed by utilizing the period corresponding to the period $T_{BLK}$, the image signals cannot be displayed during the period corresponding to the period $T_1$ after the period $T_{BLK}$, because no image signals exist during this period $T_{BLK}$. Therefore, only one fifth of one horizontal scanning time $T_H$ is used for displaying image signals and it can be said that the method is unsatisfactory from the viewpoint of high luminance.

SUMMARY OF THE INVENTION

It is an object of the invention to provide an image displaying method and apparatus capable of solving the above-described technical problem and displaying an image at a high luminance.

In order to achieve the above object, the invention provides an image displaying method of displaying an image signal having a horizontal image signal period and a horizontal blanking period, the method comprising the steps of: (a) writing a first horizontal line image signal in a write memory; (b) reading in parallel the first horizontal line image signal from a read memory during a horizontal blanking period next to the horizontal image signal period; (c) amplifying the first horizontal line image signal to thereafter perform modulation; (d) displaying the first horizontal line image signal at least until a next horizontal image signal line period terminates; and (e) sequentially repeating the steps (a) to (d) to scan horizontal lines.

According to another aspect of the invention, there is provided an image display apparatus for displaying an image signal, comprising: a linear optical deflector having optical deflectors for pixels in a horizontal direction, one horizontal line image signal being displayed at the same time by modulating in parallel the linear optical deflector.

DETAILED DESCRIPTION OF THE PREFERRED EMBODIMENTS

Embodiments of the invention will be described in detail.

Figure 1:
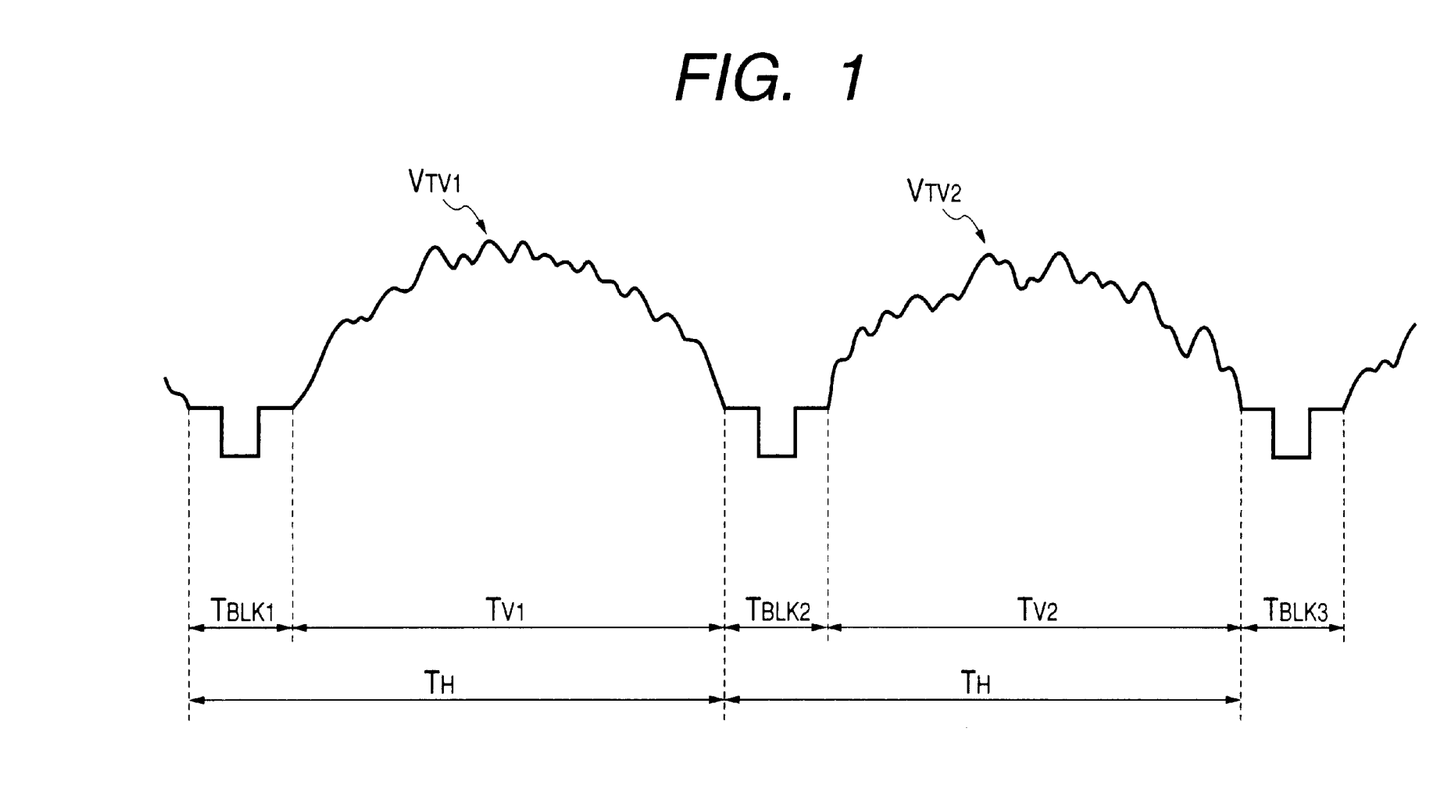
FIG. 1 is a diagram showing an example of an image signal used by an image displaying method according to an embodiment of the invention.

An image displaying method according to an embodiment of the invention uses an image signal whose one horizontal period $T_H$ has as shown in FIG. 1 a horizontal image signal period $T_V$ (e.g., 50 μsec) and a horizontal blanking period $T_{BLK}$ (e.g., 12.7 μsec). Such image signals are displayed as each horizontal line image signal at the same time by using a driver circuit such as shown in the block diagram of FIG. 2.

Figure 2:
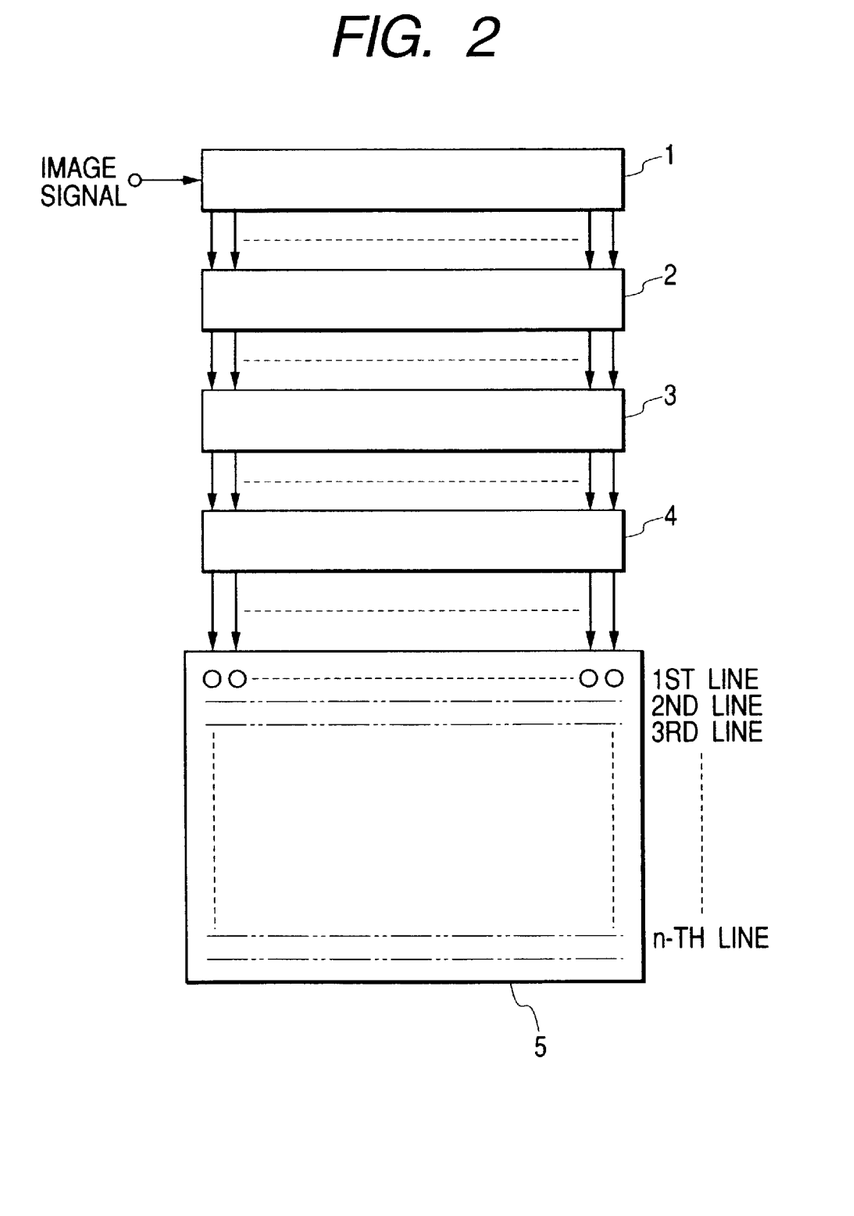
FIG. 2 is a block diagram showing a driver circuit illustrating the image displaying method of the embodiment.

In FIG. 2, reference numeral 1 represents a write memory for writing image signals same in number as the number of pixels in one horizontal line (i.e., one horizontal line image signal). Reference numeral 2 represents a read memory for reading the image signals. These memories 1 and 2 are made of, for example, sample/hold circuits and convert sequentialy image signals into parallel image signals. Reference numeral 3 represents an amplifier, reference numeral 4 represents a modulator, and reference numeral 5 represents an image display plane.

A first horizontal line image signal $V_{TV1}$ is written in the memory 1 during a first horizontal image signal period $T_{V1}$. This first horizontal line image signal $V_{TV1}$ is read to the memory 2 during the horizontal blanking period $T_{BLK2}$ following the first horizontal image signal period $T_{V1}$, and amplified by the amplifier 3. The amplified signal drives the modulator 4 and an image is displayed on the image display plane 5 at least until a second horizontal image signal period $T_{V2}$ terminates. During the second horizontal image signal period $T_{V2}$, a second horizontal line image signal $V_{TV2}$ is written in the memory 1. The above operations are repeated to scan all horizontal lines.

With the image displaying method according to the embodiment of the invention, each horizontal line image signal starts being displayed at the timing in the next horizontal blanking period and continues to be displayed at least until the next horizontal image signal period is terminated. Therefore, each pixel is driven at the maximum during one horizontal period and a high luminance can be realized.

The display start timing is not limited in particular, but it may be any timing so long as it is during the next horizontal blanking period, such as a start timing of the horizontal blanking period and any other timing. The longer the display period, the luminance becomes higher. Therefore, it is preferable to display during the full one horizontal period. For example, if the display starts at the middle of the horizontal blanking period, the display is made to continue to the middle of the next horizontal blanking period.

The modulator 4 may have the structure that an electron beam or the like output from an electron source or the like is modulated by a control electrode group or the like, similar to that described in Japanese Patent Publication No. 61-26271. The image displaying method according to the embodiment of the invention is particularly effective if light is used as a pixel illumination source which light is relatively difficult to obtain a high luminance. If light is used as a pixel illumination source, for example, a linear light deflector having light deflectors for pixels in the horizontal direction is suitable for the modulator 4.

Such a light deflector may be made of bimetal, mirror, reflection type diffraction grating or the like. A reflection type diffraction grating having a high speed response such as shown in FIG. 3 is suitable for use with the image displaying apparatus.

Figure 3:
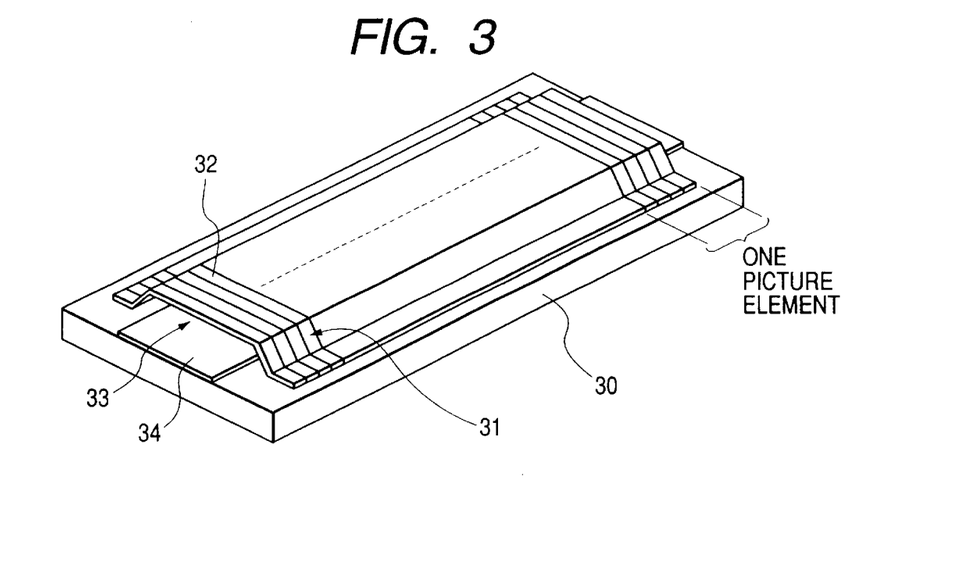
FIG. 3 is a schematic perspective view showing an example of the structure of a reflection type diffraction grating suitable for use with an image displaying apparatus according to an embodiment of the invention.

FIG. 3 is a perspective view of a reflection type diffraction grating suitable for use with the image displaying apparatus according to an embodiment of the invention. This reflection type diffraction grating is made of a light modulator having striped elements 31 disposed in a linear array on a substrate 30. The striped element 31 is made of a thin film capable of being deformed in concave and convex shapes. Four striped elements 31 correspond to one pixel, and the striped elements 31 corresponding in number to the number of pixels in the horizontal direction are provided.

The material of the substrate 30 may be silicon or the like. A passivation layer (not shown) of silicon nitride ($Si_3N_4$) or the like is formed on the substrate 30. On this passivation layer, a conductive layer 34 made of tungsten or tungsten alloy is formed.

The striped element 31 is made of silicon nitride or the like. Opposite end portions of the striped element 31 are fixed to the substrate 30 at positions away from the conductive layer 34. A flat element portion 32 at the middle of the striped element 31 is spaced from the substrate 30 to form an air gap 33 therebetween. The upper surface of the striped element 31 is covered with light reflecting material such as an aluminum film.

Figure 4A:
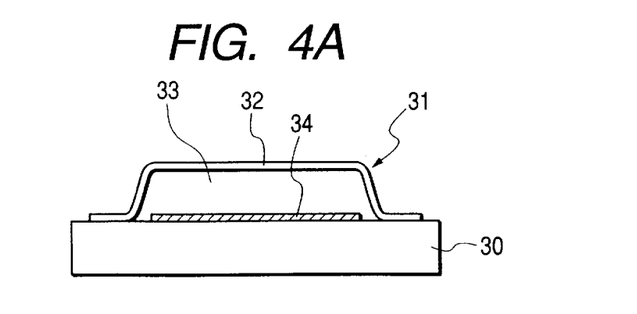
FIGS. 4A and 4B are diagrams illustrating deformation of a striped element of the diffraction grating shown in FIG. 3.
Figure 4B:
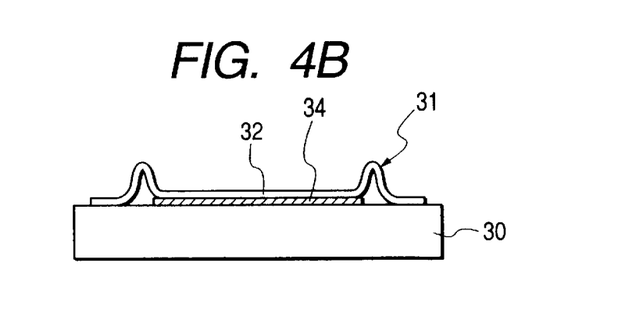

A height of the air gap 33 can be controlled by a voltage applied between the striped element 31 and conductive layer 34. When a voltage is not applied, the striped element 31 takes a convex shape such as shown in FIG. 4A. When a proper voltage is applied between the striped element 31 and conductive layer 34, the striped element 31 is deformed by electrostatic attraction and the flat element portion 32 is bent toward the substrate 30 and contacts the substrate 30.

Figure 5:
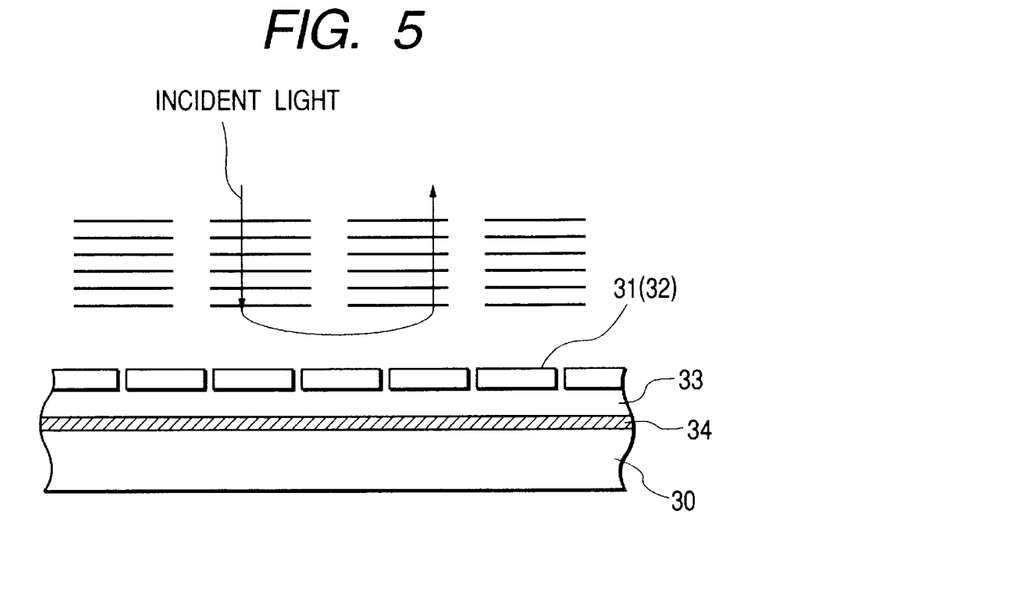
FIG. 5 is a cross sectional view illustrating modulation by the diffraction grating shown in FIG. 3 the cross sectional view being taken along a scan line.

When all of the striped elements 31 are in the convex shape as shown in FIG. 4A, if light of wavelength $\lambda$ is incident perpendicularly in a surface of the substrate 30, light reflected from the flat element portions 32 has the same phase, as shown in FIG. 5. Therefore, the striped elements function as a flat mirror.

Figure 6:
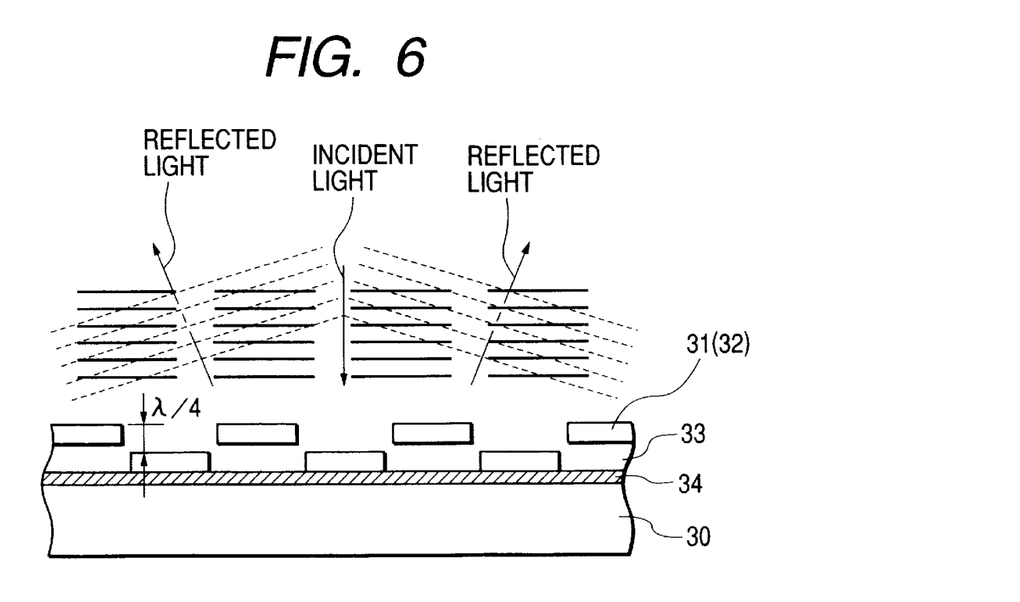
FIG. 6 is a cross sectional view illustrating modulation by the diffraction grating shown in FIG. 3 the cross sectional view being taken along the scan line.

When the striped elements 31 have alternately the convex and concave shapes (the height difference between the convex and concave shapes is preferably $\frac{1}{4}\lambda$), the light of a wavelength $\lambda$ is incident perpendicularly in the surface of the substrate 30, the phase of light reflected from the convex surface shifts greatly from the phase of light reflected from the concave surface, as shown in FIG. 6. Therefore, interference occurs between these lights reflected from the convex and concave. Thus, the light is reflected at an angle $\theta$ relative to the directions normal to the substrate.

Accordingly, if an optical lens capable of converging light reflected at the angle $\theta$ is used, the pixel does not receive the light from four striped elements 31 corresponding to the pixel by modulating them as shown in FIG. 5. Thus, this pixel can be displayed as a dark pixel. While the pixel receives light from four striped elements 31 corresponding to the pixel by modulating them as shown in FIG. 6. Thus, this pixel can be displayed as a bright pixel.

The light deflection angle $\theta$ is determined by the width of the striped element, the space between adjacent striped elements and the like. It is preferable that the width of the striped element is set to about 3.5 $\mu$m and that the space between adjacent striped elements is desirably minimized in order to reduce a light loss in the space.

Figure 7:
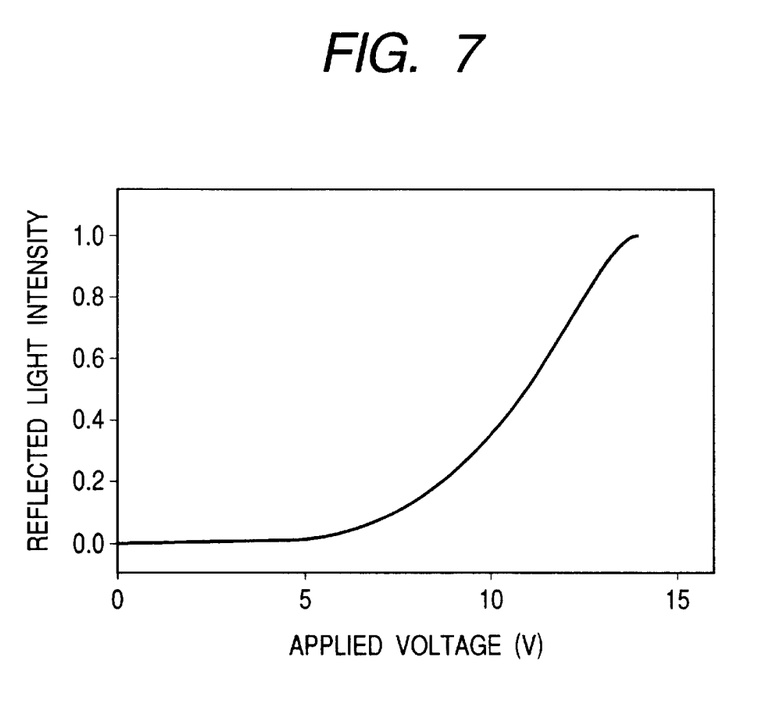
FIG. 7 is a graph showing the characteristics of applied voltage and reflected light intensity of a diffraction grating suitable for use with the image displaying apparatus of the invention.

The height of the air gap 33 can be controlled by a voltage applied between the striped element 31 and conductive layer 34, as described earlier, so that a reflected light intensity can be controlled. FIG. 7 is a graph showing an example of the characteristics of applied voltage and reflected light intensity of the reflection type diffraction grating having the above-described structure.

The light deflector using the above-described reflection type diffraction grating has a very short response period, typically about 20 nsec. Modulation is preferably made by using voltage pulses. By controlling the width and amplitude of a voltage pulse, the luminance at the image display plane can be controlled and gradation display can be made.

Figure 8:
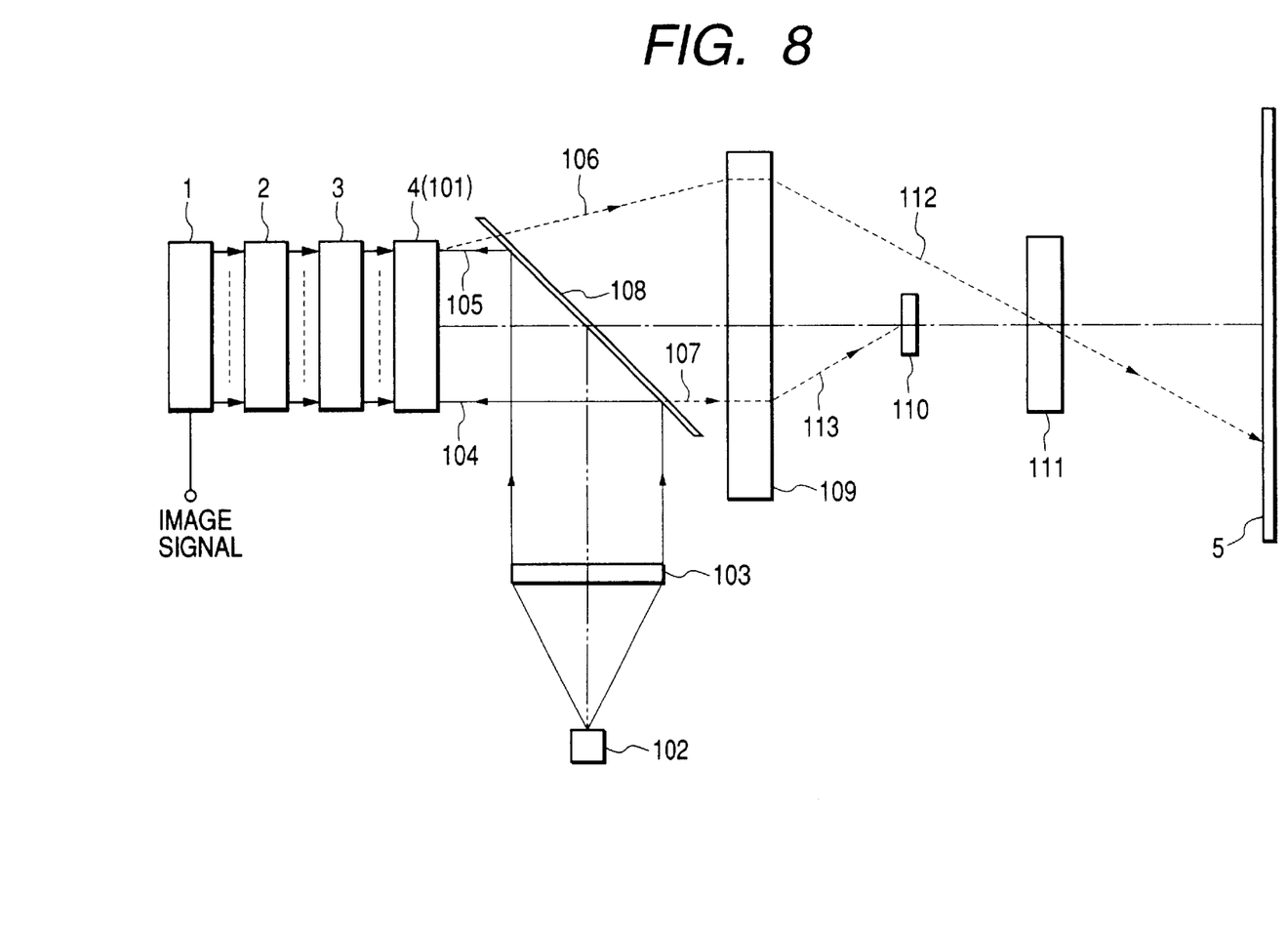
FIG. 8 is a schematic diagram showing an example of the structure of the image displaying apparatus.

FIG. 8 shows an example of an image display apparatus having the above-described linear optical deflector according to an embodiment of the invention.

In FIG. 8, elements denoted by the same reference numerals as shown in FIG. 2 denotes the same elements. Reference numeral 101 represents a linear optical deflector (reflection type diffraction grating) such as shown in FIG. 3, reference numeral 102 represents a light source, reference numeral 103 represents a lens, reference numeral 108 represents a half mirror, reference numeral 109 represents a projector lens, reference numeral 110 represents a stopper, and a reference numeral 111 represents a deflector (galvano mirror).

Light emitted from the light source 102 is converted into parallel light fluxes by the lens 103, reflected by the half mirror 108, and becomes incident upon the reflection type diffraction grating 101.

Modulation signals (voltage pulses) read in parallel from the memory 2 and amplified by the amplifier 3 are applied to the striped elements 31 of the reflection type diffraction grating 101 to modulate the striped elements in accordance with the luminance of each pixel in the horizontal direction.

When the four stripe elements corresponding to each pixel take the state shown in FIG. 5 (no modulation), incident light 104 propagates reversely along the incidence optical path and transmits through the half mirror 108. This transmitted light beam 107 is converged as a light beam 113 upon the focal point of the projector lens 109 and absorbed by the stopper 110.

When the four striped elements corresponding to each pixel take the state shown in FIG. 6 (modulation), light propagates in a direction different from incident light 105, and transmits through the half mirror 108. The transmitted light 106 is changed to a light beam 112 by the projector lens 109 and is incident via the deflector 111 in the image display plane 5 at a predetermined horizontal line. Deflection to each horizontal line is made by the deflector 111 so that sequential line display is possible.

The image displaying apparatus of this invention uses, as the pixel illuminating source for the image display plane, light instead of an electron beam which light is relatively difficult to obtain a high luminance. However, one horizontal line image signal is displayed at the same time by modulating in parallel the linear optical deflector 101 having optical deflectors for pixels in the horizontal direction and the image displaying method of this invention can be applied. Each pixel can be driven at the maximum during one horizontal period and a high luminance can be realized.

A color image displaying apparatus can be realized by using red, green and blue light sources as the light source 102. Specifically, if red is to be displayed, a voltage pulse to be applied between the striped element 31 and conductive layer 34 is controlled so as to realize a diffraction grating capable of diffracting red light at an angle θ.

According to the image displaying method of this invention, displaying of the first horizontal line image signal starts during the timing in the horizontal blanking period next to the horizontal image signal period, and continues at least until termination of the next second horizontal line image signal period. It is therefore possible to drive each pixel at the maximum during one horizontal period and realize a high luminance. A high luminance can be realized even if light which is relatively difficult to obtain a high luminance is used as the pixel exposure source, by displaying at the same time one horizontal line image signal by modulating in parallel a linear optical deflector.

If the reflection type diffraction grating having striped elements disposed in a linear array on a substrate and being capable of deforming in convex and concave shapes, is used, modulation can be made easily by using voltage pulses and gradation display is possible by controlling the width and/or amplitude of the voltage pulse.

The image displaying apparatus of this invention uses, as the pixel illuminating source for the image display plane, light instead of an electron beam, which light is relatively difficult to obtain a high luminance. However, one horizontal line image signal is displayed at the same time by modulating in parallel the linear optical deflector having optical deflectors for pixels in the horizontal direction and the image displaying method of this invention can be applied. Each pixel can be driven at the maximum during one horizontal period and a high luminance can be realized.

What is claimed is:

1. An image displaying method of displaying an image based on a horizontal image signal during a period of repeating one horizontal period comprising a horizontal image signal period and a subsequent horizontal blanking period, the method comprising:

a writing step of writing the horizontal image signal in a write memory during the horizontal image signal period;

a displaying step of reading in parallel the horizontal image signal from a read memory during a horizontal blanking period, amplifying and modulating the horizontal image signal, and displaying the image based on the horizontal image signal at least until a second horizontal image signal period of a next one horizontal period terminates; and a repeating step of repeating the writing step and the displaying step sequentially, wherein, in the displaying step, a linear image is displayed by a linear optical deflector where a plurality of optical deflectors are arranged linearly, and another linear image is displayed shiftedly in a vertical direction by the linear optical deflector in another displaying step.

2. An image displaying method according to claim 1, wherein the linear optical deflector is a reflection type diffraction grating having striped elements disposed in a linear array on a substrate, the striped element being capable of deforming in convex and concave shapes.

3. An image displaying method according to claim 2, wherein modulation of the reflection type diffraction grating is performed by applying voltage pulses.

4. An image displaying method according to claim 3, wherein gradation display is performed by controlling a width and/or amplitude of the voltage pulse.

5. An image display apparatus for displaying an image signal comprising:

a linear optical deflector arranged correspondingly to a horizontal scanning direction of an image, with said linear optical deflector comprising a plurality of optical deflectors arranged linearly, wherein said linear optical deflector displays a linear image of the plurality of optical deflectors during a horizontal blanking period in one horizontal period comprising a horizontal image signal period and subsequent horizontal blanking period, and during a horizontal image signal period in the next horizontal period, the next linear image is displayed shiftedly in a vertical direction during the horizontal blanking period of the next horizontal period and during the horizontal image signal period of the next horizontal period by said linear optical deflector based on the next image signal inputted during the horizontal image signal period during the next horizontal period.

* * * * *

UNITED STATES PATENT AND TRADEMARK OFFICE
CERTIFICATE OF CORRECTION

PATENT NO. : 6,608,621 B2
DATED : August 19, 2003
INVENTOR(S) : Noritaka Mochizuki It is certified that error appears in the above-identified patent and that said Letters Patent is hereby corrected as shown below:

<u>Title page,</u>
After *Assistant Examiner* insert the following item:
-- [74] *Attorney, Agent, or Firm*—Fitzpatrick, Cella, Harper & Scinto --.

Signed and Sealed this

Thirtieth Day of March, 2004

JON W. DUDAS
*Acting Director of the United States Patent and Trademark Office*